US008894764B2

(12) United States Patent
Archetti

(10) Patent No.: US 8,894,764 B2
(45) Date of Patent: Nov. 25, 2014

(54) APPARATUS AND METHOD FOR THE SELECTIVE NON-CATALYTIC REDUCTION (SNCR) OF NOX IN INDUSTRIAL CEMENT PRODUCTION PLANTS

(75) Inventor: Maurizio Archetti, Verscio (CH)

(73) Assignee: Ecospray Technologies S.R.L., Voghera (IT)

( * ) Notice: Subject to any disclaimer, the term of this patent is extended or adjusted under 35 U.S.C. 154(b) by 0 days.

(21) Appl. No.: 14/128,373

(22) PCT Filed: Jun. 22, 2012

(86) PCT No.: PCT/IB2012/053164
§ 371 (c)(1),
(2), (4) Date: Dec. 20, 2013

(87) PCT Pub. No.: WO2012/176161
PCT Pub. Date: Dec. 27, 2012

(65) Prior Publication Data
US 2014/0134089 A1    May 15, 2014

(30) Foreign Application Priority Data
Jun. 23, 2011    (IT) .............................. MI2011A1149

(51) Int. Cl.
*B01D 53/56*    (2006.01)
*B01D 53/74*    (2006.01)
(Continued)

(52) U.S. Cl.
CPC ............... *B01D 53/565* (2013.01); *F23J 15/04* (2013.01); *C04B 7/365* (2013.01); *B01D*
(Continued)

(58) Field of Classification Search
USPC ........ 106/761, 762; 423/235, 239.1; 422/168, 422/169, 172, 177
See application file for complete search history.

(56) References Cited

U.S. PATENT DOCUMENTS 4,080,218 A * 3/1978 Mori et al. .................... 106/762
4,263,264 A * 4/1981 Ikeda et al. ................. 423/239.1
(Continued)

FOREIGN PATENT DOCUMENTS

| DE | 3545317 A1 | 6/1987 |
|---|---|---|
| DE | 102009055942 A1 | 6/2011 |
| JP | 9206552 A | 8/1997 |

OTHER PUBLICATIONS

International Search Report and Written Opinion for corresponding PCT Application No. PCT/IB2012/053164 (mailed Oct. 5, 2012 (11 pages).

*Primary Examiner* — Timothy Vanoy
(74) *Attorney, Agent, or Firm* — LeClairRyan, a Professional Corporation

(57) ABSTRACT

The present invention relates to an apparatus and a method for the selective non-catalytic reduction (SNCR) of $NO_x$ in industrial cement production plants. In particular, the method according to the present invention provides for the atomization of an aqueous solution containing the reagent by introducing it into the gas to be treated that is at a high temperature, thus achieving the simultaneous and immediate evaporation of the water and gasification of the reagent. Thanks to this method, there is achieved improved performance of the non-catalytic reduction process of $NO_x$ while using the same reagent or, specularly, the same performance with a lesser amount of reagent being required, with consequent reduction of the costs.

12 Claims, 1 Drawing Sheet

(51) Int. Cl.
  *B01D 53/78* (2006.01)
  *F23J 15/04* (2006.01)
  *C04B 7/36* (2006.01)
  *F23J 15/00* (2006.01)
  *F23J 15/02* (2006.01)
  *F27B 7/20* (2006.01)
  *F01N 3/08* (2006.01)
  *F27D 17/00* (2006.01)

(52) U.S. Cl.
  CPC ............ 2258/0233 (2013.01); *B01D 2259/124* (2013.01); *F23J 15/006* (2013.01); *F23J 15/025* (2013.01); *B01D 2251/2067* (2013.01); *F27B 7/2033* (2013.01); *F01N 3/0821* (2013.01); *F23J 2219/20* (2013.01); *F27B 7/20* (2013.01); *B01D 53/56* (2013.01); *F23J 15/027* (2013.01); *B01D 2251/2062* (2013.01); *F27D 17/008* (2013.01)
  USPC ........ 106/761; 106/762; 423/235; 423/239.1; 422/168; 422/169; 422/172; 422/177

(56) References Cited

U.S. PATENT DOCUMENTS 5,219,544 A * 6/1993 Kupper et al. ............. 423/239.1
6,296,820 B1 * 10/2001 Frohlich et al. ............. 423/235
6,544,032 B1 * 4/2003 Brentrup ..................... 432/14

* cited by examiner

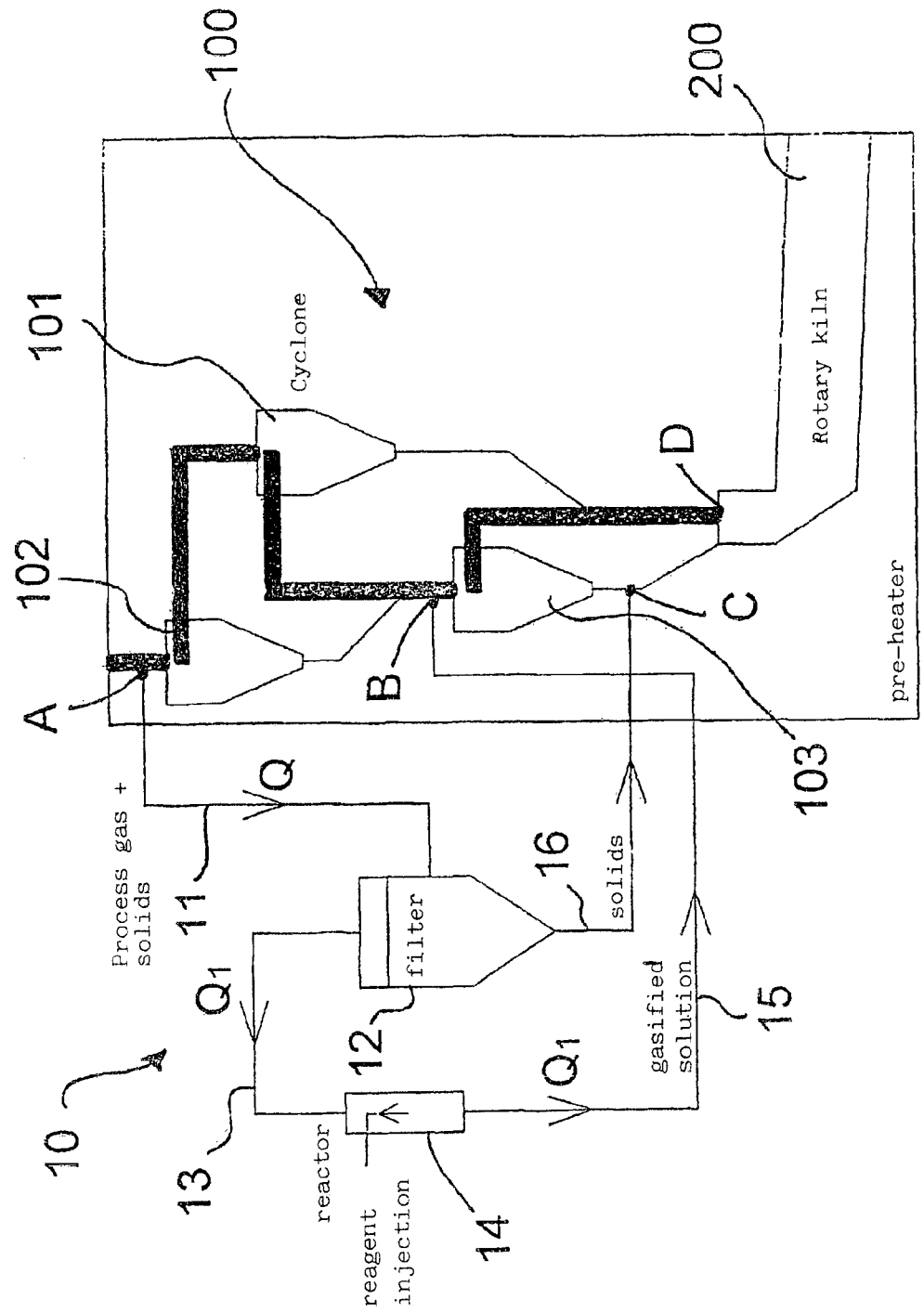

APPARATUS AND METHOD FOR THE SELECTIVE NON-CATALYTIC REDUCTION (SNCR) OF NOX IN INDUSTRIAL CEMENT PRODUCTION PLANTS

This application is a national stage application under 35 U.S.C. §371 of PCT Application No. PCT/IB2012/053164, filed 22 Jun. 2012, which claims the priority benefit of Italy Application No. MI2011A001149, filed 23 Jun. 2011.

FIELD OF THE INVENTION

The present invention relates to a method and an apparatus for the selective non-catalytic reduction SNCR of $NO_x$ in industrial cement production plants.

STATE OF THE ART

As is known, in the cement production process the clinker is obtained by firing at high temperature a mixture of raw materials primarily comprising limestone (calcium carbonate) and clay (silica, alumina, iron oxides). The raw materials are mixed in their solid state in the desired proportions and then milled until a homogenous powder known as "raw meal" or "raw mixture" is obtained. The industrial process implemented in cement factories then provides for the raw meal to be fired at high temperature in excess of 1000° C., sometimes close to 1500° C., in a kiln, generally a rotary kiln substantially comprising an inclined rotary cylinder, so as to obtain the clinker.

In order to optimise the energy performance of the entire process, in cement production plants the raw meal is preheated in a preheater before being fed into the rotary kiln.

Of the techniques in use for obtaining the preheating of the raw meal being introduced into the rotary kiln there is the technique that is based on the so-called "suspension preheater" or "multi-stage cyclone preheater", consisting of a cyclone tower in which each preheating stage takes place in one or more cyclones. In said cyclones there also takes place, in addition to the preheating of the raw meal, the separation of the preheated meal and the combustion fumes.

In fact, as is known, the cyclones are arranged in a cascade so that the combustion fumes from the rotary kiln flow through them in counter-flow.

The preheating phases allow the rotary kiln to be fed with meal partially calcined and preheated at a temperature of around 900-950° C., with a significant reduction in power consumption in the subsequent clinkerisation reaction.

The preheating phase further allows the use of rotary kilns having more contained dimensions, thus reducing the heat losses that occur in said kilns and increasing the overall energy efficiency of the clinker production process.

In the preheater, the starting raw meal is therefore gradually brought from a temperature of around 40° C. to a temperature of around 900° C. at the kiln inlet, taking advantage of the heat emitted by the combustion gases originating from the kiln itself.

Reheating of the raw meal is achieved by maintaining the meal in suspension in a stream of hot gases, comprising the combustion fumes of the rotary kiln and possibly of the combustion fumes of the precalciner, while exploiting the large heat exchange surface between the meal and the gaseous phase.

Without going into the details of the operation, that is amongst other things, known, of the process implemented in the preheater, it is important to bear in mind how in preheating the meal the duration of the contact parameters between the solid phase (meal) and the gaseous phase (combustion fumes of the rotary kiln) are important. To guarantee the optimal contact time between the solid phase and the gaseous phase, the suspension preheater consists of a series of cyclones arranged one on top of the other to form a tower of variable height.

The accompanying FIG. 1 shows, in the part on the right, a simplified diagram of a cyclone preheater. Said preheater is generically indicated by the reference number 100, and the cyclones arranged in a cascade are respectively indicated by the numbers 101, 102, 103. The rotary kiln is indicated by the reference number 200.

With reference to what has been illustrated so far and according to what is known in the prior art of cement production plants, at the level of the point indicated by the letter A in FIG. 1 the temperature of the meal can be of around 500° C., in that the cyclone indicated by the number 102 will not be the first of the cyclones in cascade but will have above it other cyclones similar thereto.

The raw meal tangentially enters into a cyclone, is invested by the stream of hot fumes, and continues downwards due to gravity, falling into the underlying cyclone. At the level of the point D, at the rotary kiln inlet, the raw meal will therefore have a temperature of around 900° C., as previously mentioned.

The stream of hot fumes discharged from the rotary kiln is therefore directed upwards and meets the cyclones, preheating the raw meal, during its journey towards the gas outlet section of the tower itself, which takes place at the level of the top of the cyclone tower.

The preparation of clinker in a cement production plant such as the one described above generates huge volumes of gaseous emissions that are potentially pollutant on the environment.

In particular, the gaseous stream discharged from the preheater is characterised by a high concentration of pollutant substances, in particular nitrogen oxides $NO_x$ and powders. The NOx derive primarily from the combustion processes that take place in the rotary kiln and, possibly, in the precalciner. The main techniques currently used to reduce the concentration of $NO_x$ in the gases before release into the atmosphere, are:

selective non-catalytic reduction, generally indicated by SNCR, English acronym for Selective-Non-Catalytic-Reduction, which envisages the reaction of $NO_x$ with a reducing agent (for example ammonia or urea) in the high temperature zone of the preheater;

selective catalytic reduction, generally indicted by SCR, English acronym for Selective-Catalytic-Reduction, which envisages the reaction of $NO_x$ with $NH_3$ or Urea as a reducing agent in the presence of a catalyst.

The present invention indeed relates to an apparatus and a method for the selective non-catalytic reduction SNCR of $NO_x$ in industrial cement production plants.

According to what is known in the prior art, the SNCR denitrification processes take place by introducing a reducing agent, for example urea or ammonia, into the gas to be purified by means of direct atomization of the reducing solution into the gas stream.

As mentioned, in the preheater the high temperature gas discharged from the kiln preheats the limestone meal before it enters the kiln for firing. In addition to $NO_x$ the gas also contains a high quantity of solids in suspension.

The concentration of solids in suspension in the hot gases varies between 40 g/Nm3 and 1000 g/Nm3. This concentration of powders in suspension limits the efficacy of the currently known SNCR denitrification processes, which envisage the direct injection of aqueous solutions containing a reducing agent, such as ammonia or urea, in the form of miniscule droplets (spray) that are emitted at high temperature, 750-1050° C., directly into the gas stream to be treated.

However, the direct injection of the aqueous solution of urea or ammonia into the preheater causes a number of drawbacks.

A first drawback consists of the fact that the direct atomization of the aqueous solution into the gas entails contact of the droplets of solution with the powders present in the gases. Direct contact between the solid particles and the droplets of aqueous solution containing the reducing agent cause chemical reactions that "bind" the droplets to the solid particles. These reactions remove a large part of the reducing agent and the performance of the denitrification reaction decreases considerably.

Or, with equal denitrification performance, it becomes necessary to atomize a greater quantity of reducing agent, for example urea or ammonia as mentioned, with consequent increase in plant operating costs.

A further drawback that afflicts the SNCR systems that envisage the direct atomization of aqueous solution of ammonia or urea into the gas to be treated consists of the fact that the solids in suspension in the gas and absorbed are separated and transported towards the kiln where, due to the very high temperatures present, the reagents are freed and oxidised and are partially or totally transformed into $NO_x$, thus dramatically reducing the efficiency of the process, in that a part of the reagent is lost or indeed transformed into $NO_x$.

These drawbacks, linked to the costs of the reagents, ensure that there is market demand for denitrification methods (DeNOx) having greater performance, at the same time capable of optimizing the amounts of reagents used, thus reducing the costs, and optimizing process performance, while preventing part of this reagent from generating other NOx to be discharged prior to emission of the gases into the atmosphere.

SUMMARY OF THE INVENTION

The main objective of this invention is therefore that of providing a method and an apparatus for the selective non-catalytic reduction SNCR of NOx in industrial cement production plants that allows the drawbacks that afflict the systems known in the prior art to be overcome.

Within the scope of this objective, the aim of this invention is that of providing a method and an apparatus for the selective non-catalytic reduction SNCR of $NO_x$ that allows optimization of the consumption of the reagent, in particular of urea or ammonia, thus optimizing the management costs of the denitrification process, and optimizing the performance of the process, preventing part of this reagent from generating other $NO_x$ to be discharged before the emission of the gases into the atmosphere.

This objective and these and other aims that will become clearer below, are achieved by a method and by an apparatus for the selective non-catalytic reduction SNCR of $NO_x$ as defined by the accompanying claims.

Even more in particular, these objectives and these aims are achieved by a method for the selective non-catalytic reduction of $NO_x$, comprising the following phases:

tapping a flow Q of gas to be treated, from the preheater of a cement production apparatus, at a point of the preheater where said gas has a temperature of between 180° C. and 800° C.;

channelling said gas flow to a filter element adapted to separate the solid particles of the gaseous stream, for example a ceramic candle filter or a felt bag filter or a cyclone;

channelling the clean gas discharged from said filter element to a reactor into which the reagent is injected in the form of an aqueous solution;

atomizing the aqueous solution containing the reagent by introducing into the gas to be treated, thus obtaining the simultaneous and immediate evaporation of water and gasification of the reagent;

reintroducing the flow of gas containing the gasified reagent into said preheater into a zone having a gas temperature of temperature of between 750 and 1100° C.

In addition, these objectives and aims are achieved by an apparatus for the selective non-catalytic reduction SNCR of $NO_x$ in industrial cement production plants comprising a gas suction line connected to the exhaust pipe for the hot combustion gases of a preheater of a cement production plant and adapted to tap a flow Q, a filter element adapted to separate from said flow Q the clean gaseous phase $Q_1$ from the solid particles, a return line for reintroducing said solid particles into said preheater, a reactor for injecting a reagent in aqueous solution into said flow $Q_1$ of clean gas, a return line of said clean gas flow containing reagent in gaseous state for reintroducing the clean gas containing reagent into said preheater.

DESCRIPTION OF THE DRAWING

Further characteristics and advantages of the present invention will become clearer from the below detailed description, given by way of a non-limiting example and illustrated in FIG. 1, which shows a diagram of the apparatus for the selective non-catalytic reduction SNCR of $NO_x$ in the industrial cement production plants according to this invention.

DETAILED DESCRIPTION OF THE INVENTION

According to one preferred embodiment of the present invention illustrated in the aforementioned FIG. 1 by way of a non-limiting example, said apparatus is generically indicated by the reference number 10. The apparatus 10 for the induction of $NO_x$ according to the present invention is suitable for being inter-connected to a clinker production plant, and the accompanying FIG. 1 shows, in the part on the right, a simplified diagram of a cyclone preheater of a clinker production plant. Said preheater is generically indicated by the reference number 100, and the cyclones arranged in a cascade are respectively indicated by the numbers 101, 102, 103. The rotary kiln is indicated by the reference number 200.

With reference to what has been illustrated thus far and according to what is known in the prior art of cement production plants, at the level of the point indicated by the letter A in FIG. 1, the temperature of the meal, and therefore of the gases can be of around 500° C., while at the level of the point indicated by the letter D, the temperature of the gases can be of around 900° C.

The method according to the present invention envisages the removal of a flow Q of process gas (typically of between 500 Nm3/h and 5000 Nm3/h) containing solid particles from the preheater at a point, indicated by A, in which the temperature of the gas is of between 200 and 600° C., and the channelling of said gases in a filter element 12.

For such purposes the apparatus according to this invention will therefore comprise a first conduit 11, which is suitable for connection to a point A of said preheater and for channelling the flow Q of process gas containing solid particles to the filter element 12, which can consists of a ceramic candle filter or of a felt bag filer or of a cyclone of the same type as those present in the preheater 100.

The filter element 12 therefore separates the solid particles from the gas. The solid particles are reintroduced into the preheater through the conduit 16 for the reintroduction of the solid particles into the preheater at the level of point C, upstream of the rotary kiln 200.

The flow $Q_1$ of clean gas that is discharged from the filter element 12, without the solid particles, is channelled through the conduit 13 to the reactor 14, which has the function of injecting an aqueous solution of reagent into the flow $Q_1$ of clean gas.

In particular, the reactor 14 injects an aqueous solution of reagent, preferably urea or ammonia.

On account of the high temperature, which can be indicated as of between 200 and 600° C., of the gas $Q_1$ discharged from the filter element 12, when the aqueous solution is injected into the gas flow $Q_1$ the water evaporates and the reagent immediately gasifies, in an extremely limited time, typically of 0.3-1 sec. The hot gas necessary for evaporation of the reagent solution is thus collected directly from the preheater, or from the by-pass line or using the hot air from the clinker cooler.

The gas collection point can be the point indicated by A or on any other point of the cement production plant with gas temperature of between 200 and 600° C.

The outlet flow of gas from the reactor, containing reagent in gaseous state, is therefore readmitted through the conduit 15 in the preheater 100, into a zone, indicated by point B, in which the temperature of the gases is of between 750 and 1100° C.

According to one preferred aspect of the present invention, the reagent can consist of ammonia or of urea.

In the case of the former, the aqueous solution can contain ammonia in percentages preferably comprising between 10 and 30% by volume.

In the case of urea, the aqueous solution can contain urea in percentages preferably comprising between 5 and 60% by volume.

Again, according to one possible variant of the method and of the apparatus according to the present invention, the clean gas Q1 in which the urea has been vaporised, we are therefore in the conduit 15 downstream of the reactor 14, before being reintroduced into the preheater at point B, is made to cross appropriate ceramic catalysers containing an amount of between 1% and 10% by weight of vanadium pentoxide ($V_2O_5$) and/or containing an amount of between 10% and 100% by weight titanium dioxide ($TiO_2$) as additive. In the catalyst, the products of the preventive atomization of urea in the hot gas are further converted into active gaseous compounds for the denitrification of the combustion gas.

The resulting gas is injected directly into the preheater in a zone where the temperature of the gases is of between 750 and 1100° C., i.e. still at the level of the point B as indicated in the diagram of FIG. 1.

The apparatus according to the present invention is therefore able to perform the method of selective non-catalytic reduction (SNCR) of $NO_x$ in industrial cement production plants.

It has thus been shown that the method and the apparatus according to the present invention achieve the proposed aim and objectives. In particular, it has been shown that the method of selective non-catalytic reduction of $NO_x$ in industrial cement production plants according to the present invention allows the performance of the denitrification process to be optimised while decreasing the amount of reagent needed for the same efficiency of the reduction or, vice versa, while increasing the efficiency of the reduction process and using the same reagent.

It has in particular been noted that the method according to the present invention, while permitting the immediate gasification of the reagent in the gas to be treated instead of the liquid-state atomization typical of the processes known in the prior art, allows the described drawbacks that afflict the de-$NO_x$ methods and plants in which the droplets of atomized reagent bind to the solid particles present in the gas to be treated to be eliminated, with the above-described drawbacks.

The apparatus according to the present invention, adapted to perform the method object of this invention, allows the reagent to be gasified directly within the gas to be treated, preventively treated to eliminate any solid particles contained therein, so as to optimize the performance of the non-catalytic $NO_x$ reduction process.

The method and the apparatus according to the present invention allow a great reduction of the operating costs of the gas denitrification process of a cement production plant, primarily in that the increased efficiency of the gas reduction process entails a lesser consumption of reagent (urea or ammonia), and in that the process does not require the provision of new power to the apparatus achieving it, in that the temperature required for gasification of the reagent is achieved by directly tapping the gases to be treated at a point of the clinker production plant in which the gases themselves have the necessary temperature.

A number of changes can be made by the sector profession without straying from the scope of protection pursuant to this invention. The scope of protection of the claims should not therefore be restricted to the illustrations or to the preferred embodiments provided by way of example in the description; the claims should instead include all the characteristics of patentable novelty arsing from the present invention, including all the characteristics that are deemed to be equivalent by a sector technician.

The invention claimed is:

1. A method for the selective non-catalytic reduction SNCR of $NO_x$ of process gas in industrial cement production systems, comprising the following steps:
    tapping a flow (Q) of gas to be treated from any point of the cement production system in which said gas has a temperature comprised between 180° C. and 800° C.;
    conveying said flow (Q) of gas to a filtering element adapted to separate possible solid particles from the gaseous current;
    conveying the clean gas let out from said filtering element to a reactor in which the reactant in form of aqueous solution is injected;
    atomizing aqueous solution containing the reactant introducing into the gas to be treated, thus obtaining the simultaneous, immediate evaporation of water and gasification of the reactant;
    reintroducing the flow ($Q_1$) of gas containing the reactant also in gaseous state into a preheater into a zone with gas temperature comprised between 750 and 1100° C.

2. The method as set forth in claim 1, wherein said reactant is constituted by ammonia.

3. The method as set forth in claim 1, wherein said reactant is constituted by urea.

4. The method as set forth in claim 1, wherein said flow ($Q_1$) of gas containing reactant in gaseous state before being reintroduced into said preheater crosses appropriate ceramic catalyzers containing vanadium pentoxide ($V_2O_5$) as additive in amount by weight from 1% to 10%.

5. The method as set forth in claim 1, wherein said flow ($Q_1$) of gas containing reactant in gaseous state before being reintroduced into said preheater crosses appropriate ceramic catalyzers containing titanium dioxide ($TiO_2$) as additive in amount by weight from 10% to 100%.

6. The method as set forth in claim 1, wherein the flow (Q) of gas is tapped at a point of the preheater in a cement production system.

7. An apparatus for the selective non-catalytic reduction SNCR of $NO_x$ in cement production industrial systems, comprising a suction line of the gases to be treated connectable to the hot gas exhaust pipe of a preheater of a cement production system and adapted to tap a flow (Q) of said hot combustion gases, and further comprising a filtering element adapted to separate from said flow (q) the gaseous phase ($Q_1$) cleaned from the solid particles, a return line for reintroducing in said solid particles into said preheater, a reactor for injecting reactant in aqueous solution in said flow ($Q_1$) of clean gas, a return line connectable to said preheater at a reintroduction point for reintroducing said flow ($Q_1$) of clean gas containing reactant in gaseous state into said preheater.

8. The apparatus as set forth in claim 7, wherein said apparatus is connectable to said preheater in a cement production system at a point in which the process gas to be treated has a temperature comprised between 180 and 800° C.

9. The apparatus as set forth in claim 7, wherein said reintroduction point of said clean gas flow ($Q_1$) is a point in which the process gas in the preheater has a temperature comprised between 750 and 1100° C.

10. The apparatus as set forth in claim 7, wherein said filtering element is constituted by a ceramic candle filter.

11. The apparatus as set forth in claim 7, wherein said filtering element is constituted by a felt bag filter.

12. The apparatus as set forth in claim 7, wherein said filtering element is constituted by a cyclone.

* * * * *